No. 786,857. Patented April 11, 1905.

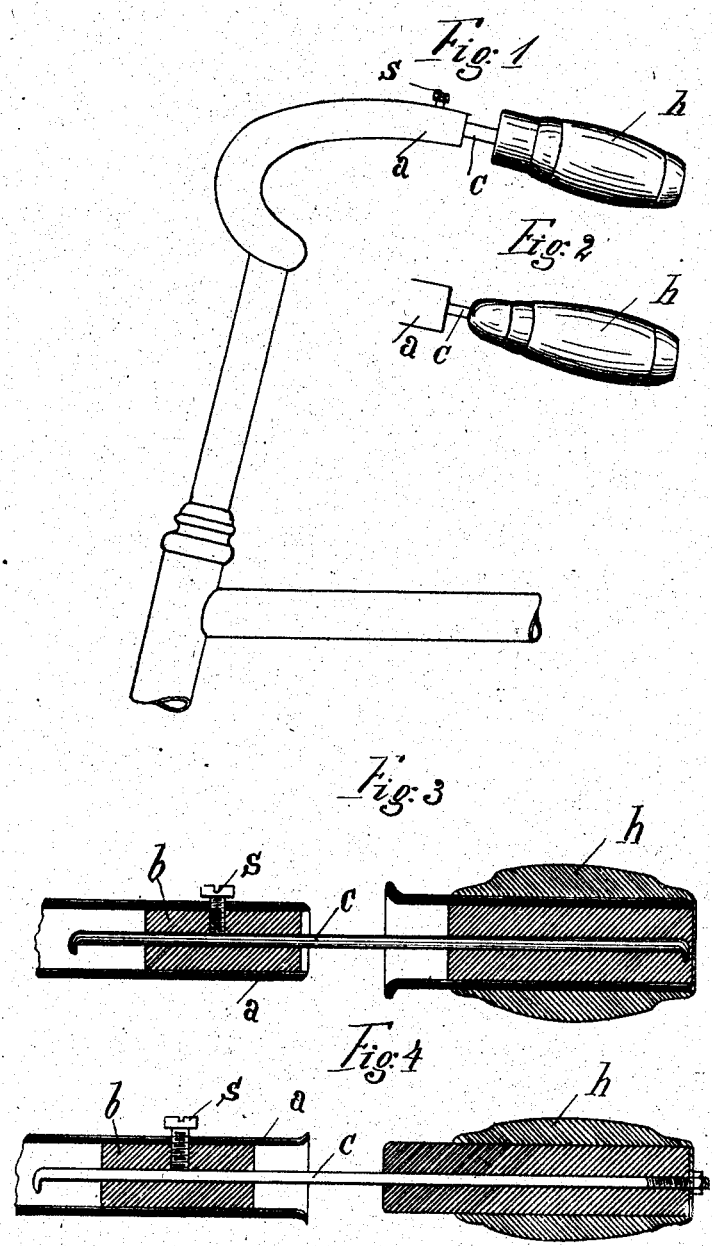

UNITED STATES PATENT OFFICE.

MARTIN THIERFELDER, OF ZWICKAU, GERMANY.

RESILIENT HANDLE-BAR FOR BICYCLES OR THE LIKE.

SPECIFICATION forming part of Letters Patent No. 786,857, dated April 11, 1905.

Application filed December 8, 1903. Serial No. 184,246.

*To all whom it may concern:*

Be it known that I, MARTIN THIERFELDER, medical doctor, residing at Zwickau, Saxony, Germany, have invented new and useful Improvements in Resilient Handle-Bars for Bicycles or the Like, of which the following is a specification.

The handle-bars for bicycles, tricycles, and other vehicles have been connected with the fork of the front wheel by strong spiral springs in order to avoid the jars of the wheel while riding over rough ground. These devices have the inconvenience that the rider looses the control of his wheel on rough ground just where the resiliency is most desirable, because these springs yield also laterally and cannot prevent accidental turning of the wheel with the same efficiency as a fork which is rigidly connected with the handle-bar.

The present invention is designed to obviate this inconvenience, and it is represented in the accompanying drawings, in which—

Figure 1 shows the new device in side elevation. Fig. 2 shows a modified form of the handle. Figs. 3 and 4 are longitudinal sections through the handle and the end of the handle-bar.

The handle-bar is made a little shorter than usual, according to the present invention, and in the ends $a$ a sleeve $b$ is inserted, having a rectangular longitudinal perforation adapted to receive a flat spring $c$, which is with one end secured to the handle $h$, while the other end can freely slide in the longitudinal hole of the sleeve $b$ and can be adjusted therein and set fast by a set-screw $d$.

Figs. 1 and 3 show that the handle is provided with a tubular part adapted to slip over the end $a$ of the handle-bar, so that the latter can be used like a rigid handle-bar when the spring $c$ is pushed altogether inside. Figs. 2 and 4 show a modified arrangement for the same purpose, the handle $h$ inclosing a solid part, to which the end of the spring $c$ is screwed. The said solid part can be moved into the end of the handle-bar.

Having thus described my invention, what I claim as new, and desire to secure by Letters Patent of the United States, is—

1. A resilient handle-bar for bicycles or the like, comprising a handle-bar, sleeves $b$ rigidly secured in the ends of said bar, rectangular longitudinal openings in said sleeves, flat steel springs slidingly inserted therein, and set-screws inserted into the ends of said bar and the sleeves in the same for adjusting the length of the active part of the spring.

2. A resilient handle-bar for bicycles or the like, comprising a handle-bar, sleeves $b$ rigidly secured in the ends of said bar, rectangular longitudinal openings in said sleeves, flat steel springs slidingly inserted therein, and set-screws inserted into the ends of the said bar and the sleeves in the same for adjusting the length of the active part of the spring, and handles secured on the outer end of the springs, being provided with a tubular projection to fit over the free end of the handle-bar and to form a rigid connection therewith.

In testimony whereof I affix my signature.

MARTIN THIERFELDER.

In presence of—
M. L. CREEVEY,
C. A. CREEVEY.